(12) United States Patent
Germain (10) Patent No.: US 7,055,832 B2
(45) Date of Patent: Jun. 6, 2006

(54) VEHICLE ROLL CONTROL SYSTEM (75) Inventor: Philippe Germain, Montreuil (FR)

(73) Assignee: Delphi Technologies, Inc., Troy, MI (US)

( * ) Notice: Subject to any disclaimer, the term of this patent is extended or adjusted under 35 U.S.C. 154(b) by 315 days.

(21) Appl. No.: 10/473,458

(22) PCT Filed: Apr. 2, 2002

(86) PCT No.: PCT/EP02/06311

§ 371 (c)(1),
(2), (4) Date: Sep. 30, 2003

(87) PCT Pub. No.: WO02/083439

PCT Pub. Date: Oct. 24, 2002

(65) Prior Publication Data
US 2004/0090019 A1 May 13, 2004

(30) Foreign Application Priority Data
Apr. 10, 2001 (GB) .................................. 0108919.2

(51) Int. Cl.
*B60G 21/67* (2006.01)
*B60G 21/73* (2006.01)

(52) U.S. Cl. ................. 280/5.508; 280/5.511; 280/124.106; 280/124.158; 280/124.161

(58) Field of Classification Search ......... 280/124.106, 280/124.107, 5.506, 5.507, 5.511, 5.508, 280/124.157, 124.158, 124.16, 124.161, 280/124.103
See application file for complete search history.

(56) References Cited

U.S. PATENT DOCUMENTS 2,184,202 A * 12/1939 Tschanz ................... 280/5.506
3,895,820 A * 7/1975 Takahashi et al. ........ 280/6.158
4,930,807 A * 6/1990 Lachaize ................. 280/5.505
5,682,980 A * 11/1997 Reybrouck ............... 280/5.504
5,941,334 A * 8/1999 Inagaki ........................ 180/242
5,948,028 A * 9/1999 Raad et al. .................... 701/37

(Continued)

Primary Examiner—Paul N. Dickson
Assistant Examiner—Tiffany Webb
(74) Attorney, Agent, or Firm—Michael D. Smith (57) ABSTRACT A roll control system for a motor vehicle comprising a torsion bar (16); a first hydraulic actuator (12) connected to one end (20) of the torsion bar and connectable to an axle (34) of the vehicle; a second hydraulic actuator (14) connected to the other end (28) of the torsion bar and connectable to the axle of the vehicle; a hydraulic control system (62) connected to the hydraulic actuators and including a source of fluid pressure (66), a fluid reservoir (68), at least one supply valve (74, 76), and a pressure control valve (70); and an electrical control system (64) controlling the hydraulic system dependent on sensed vehicle conditions; wherein each hydraulic actuator comprises a rebound chamber (42, 52) and a compression chamber (40, 50) separated by a piston (38, 48), and a piston rod (18, 26) attached to the piston and extending through and out of the rebound chamber; wherein, during straight line motion of the vehicle, the electrical control system actuates the supply valve or valves to isolate the rebound chambers and to connect the compression chambers to the fluid reservoir, and wherein, during turning motion of the vehicle in one direction, the electrical control system actuates the supply valve or valves to connect the rebound chambers to a controlled fluid pressure form the hydraulic control system, to connect the compression chamber remote from the turning direction to the controlled fluid pressure, and to connect the other compression chamber to the fluid reservoir. Provides smooth roll control during change in turning direction.

22 Claims, 7 Drawing Sheets

U.S. PATENT DOCUMENTS

| | | | |
|---|---|---|---|
| 6,053,510 A * | 4/2000 | Kokotovic | 280/5.508 |
| 6,098,994 A * | 8/2000 | Kunishima et al. | 280/5.514 |
| 6,175,792 B1 * | 1/2001 | Jones et al. | 701/37 |
| 6,254,108 B1 * | 7/2001 | Germain et al. | 280/5.506 |
| 6,871,866 B1 * | 3/2005 | Gloceri et al. | 280/124.154 |
| 6,942,230 B1 * | 9/2005 | Fontdecaba Buj | 280/124.104 |

* cited by examiner

VEHICLE ROLL CONTROL SYSTEM

TECHNICAL FIELD

The present invention relates to a roll control system for a motor vehicle.

BACKGROUND OF THE INVENTION

EP-A-0783986 describes a roll control system in which hydraulic actuators are powered to provide active roll control for the vehicle. The actuators generate torsion in the vehicle's torsion bars.

SUMMARY OF THE INVENTION

The aim of the present invention is to provide an active roll control system which is an improvement to known arrangements.

A roll control system in accordance with the present invention is characterised by the features specified in claim 1.

The present invention provides a smooth transition between left and right turns.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
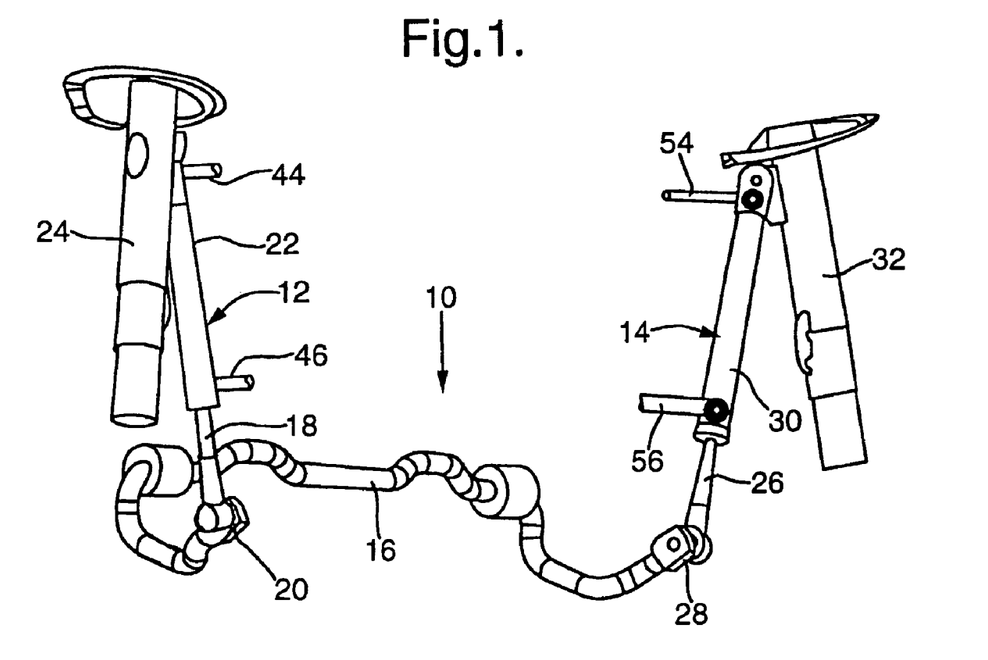
FIG. 1 is a view of the hydraulic actuators and torsion bar of a roll control system in accordance with the present invention for one axle of a motor vehicle.

FIG. 1 shows a portion of a roll control system 10 in accordance with the present invention for one axle of a motor vehicle. The roll control system 10 includes a first hydraulic actuator 12, a second hydraulic actuator 14, and a torsion bar 16. The first actuator 12 has a piston rod 18 which is fixed to one end 20 of the torsion bar 16; and a housing 22 which is connected to one of the shock absorbers 24 associated with the vehicle axle. The second actuator 14 has a piston rod 26 which is fixed to the other end 28 of the torsion bar 16; and a housing 30 which is connected to the other shock absorber 32 associated with the vehicle axle.

The first and second actuators 12,14 are substantially identical, and further details are given below.

Figure 2:
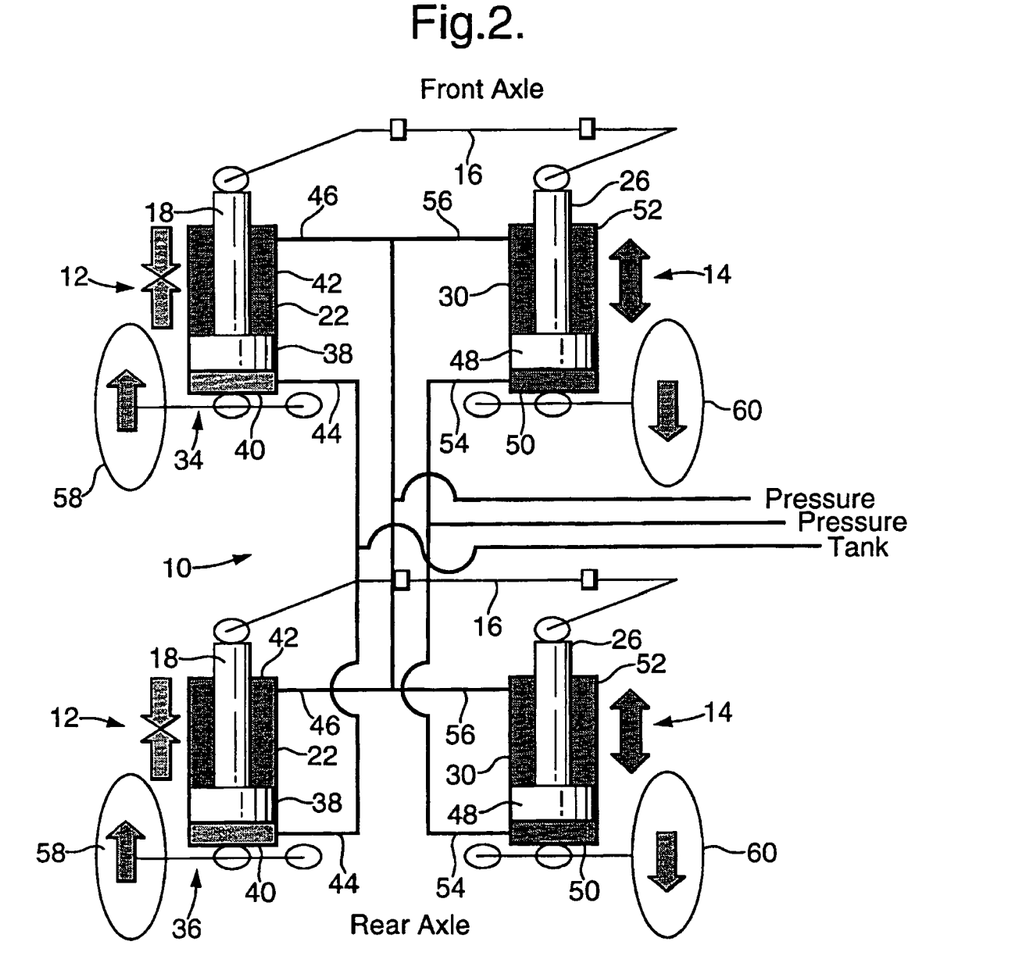
FIG. 2 is a schematic view of a roll control system in accordance with the present invention, during cornering of the vehicle to the left, with the hydraulic system and electrical control system omitted for clarity.
Figure 3:
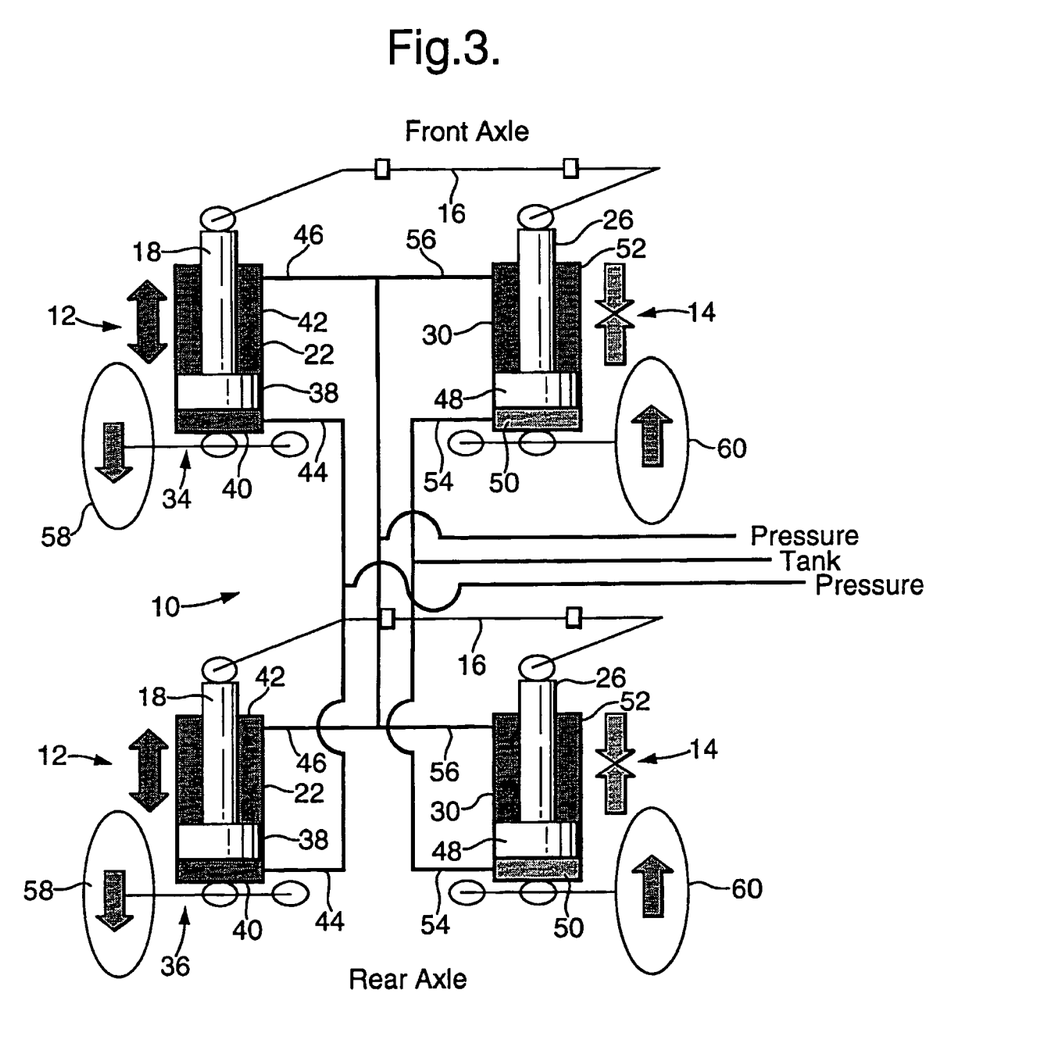
FIG. 3 is a schematic view of the roll control system of FIG. 2 during cornering to the right.

In FIGS. 2 and 3, further details of the roll control system 10 of FIG. 1 are shown in connection with the front axle 34 and the rear axle 36 of the vehicle. The first and second actuators 12,14 and the torsion bar 16 for each axle are substantially identical. Each first actuator 12 comprises the housing 22; a piston 38 sealably slidably mounted inside the housing; a compression chamber 40 and a rebound chamber 42 defined by the piston inside the housing; the piston rod 18 connected to the piston, extending through the rebound chamber, and out of the housing; a fluid line 44 connected to the compression chamber; and a fluid line 46 connected to the rebound chamber. The compression chambers 40 of each first actuator 12 are fluidly connected. The rebound chambers 42 of each first actuator 12 are fluidly connected. Each second actuator 14 comprises the housing 30; a piston 48 sealably slidably mounted inside the housing; a compression chamber 50 and a rebound chamber 52 defined by the piston inside the housing; the piston rod 26 connected to the piston, extending through the rebound chamber, and out of the housing; a fluid line 54 connected to the compression chamber; and a fluid line 56 connected to the rebound chamber. The compression chambers 50 of each second actuator 14 are fluidly connected. The rebound chambers 52 of each second actuator 14 are fluidly connected, and are fluidly connected with the rebound chamber 42 of each first actuator 12.

During vehicle cornering to the left (FIG. 2), the roll control system 10 is actuated to apply fluid pressure to the rebound chamber 42, 52 of the first and second actuators 12,14, and to the compression chambers 50 of the second actuators 14. The system 10 is also actuated to connect the compression chambers 40 of the first actuators 12 to a tank (fluid reservoir). The cross-sectional area of the pistons 38,48 and piston rods 18,26 of the actuators 12,14 are predetermined and known; the applied fluid pressure is preferably measured (or may be assumed); and the tank pressure is preferably measured (or may be assumed). The applied fluid pressure is controlled such that the left wheels 58 of the vehicle tend to move to compress the first actuators 12, and the right wheels 60 tend to move the extend the second actuators 14. The various parameters are set such that the resultant force compressing the first actuators 12 is greater than the resultant force extending the second actuators 14.

During vehicle cornering to the right (FIG. 3), the roll control system 10 is actuated to apply fluid pressure to the rebound chamber 42, 52 of the first and second actuators 12,14, and to the compression chambers 40 of the first actuators 12. The system 10 is also actuated to connect the compression chambers 50 of the second actuators 14 to a tank (fluid reservoir). The cross-sectional area of the pistons 38,48 and piston rods 18,26 of the actuators 12,14 are predetermined and known; the applied fluid pressure preferably measured (or may be assumed); and the tank pressure is preferably measured (or may be assumed). The applied fluid pressure is controlled such that the right wheels 60 of the vehicle tend to move to compress the second actuators 14, and the left wheels 58 tend to move the extend the first actuators 12. The various parameters are set such that the resultant force compressing the second actuators 14 is greater than the resultant force extending the first actuators 12.

Figure 4:
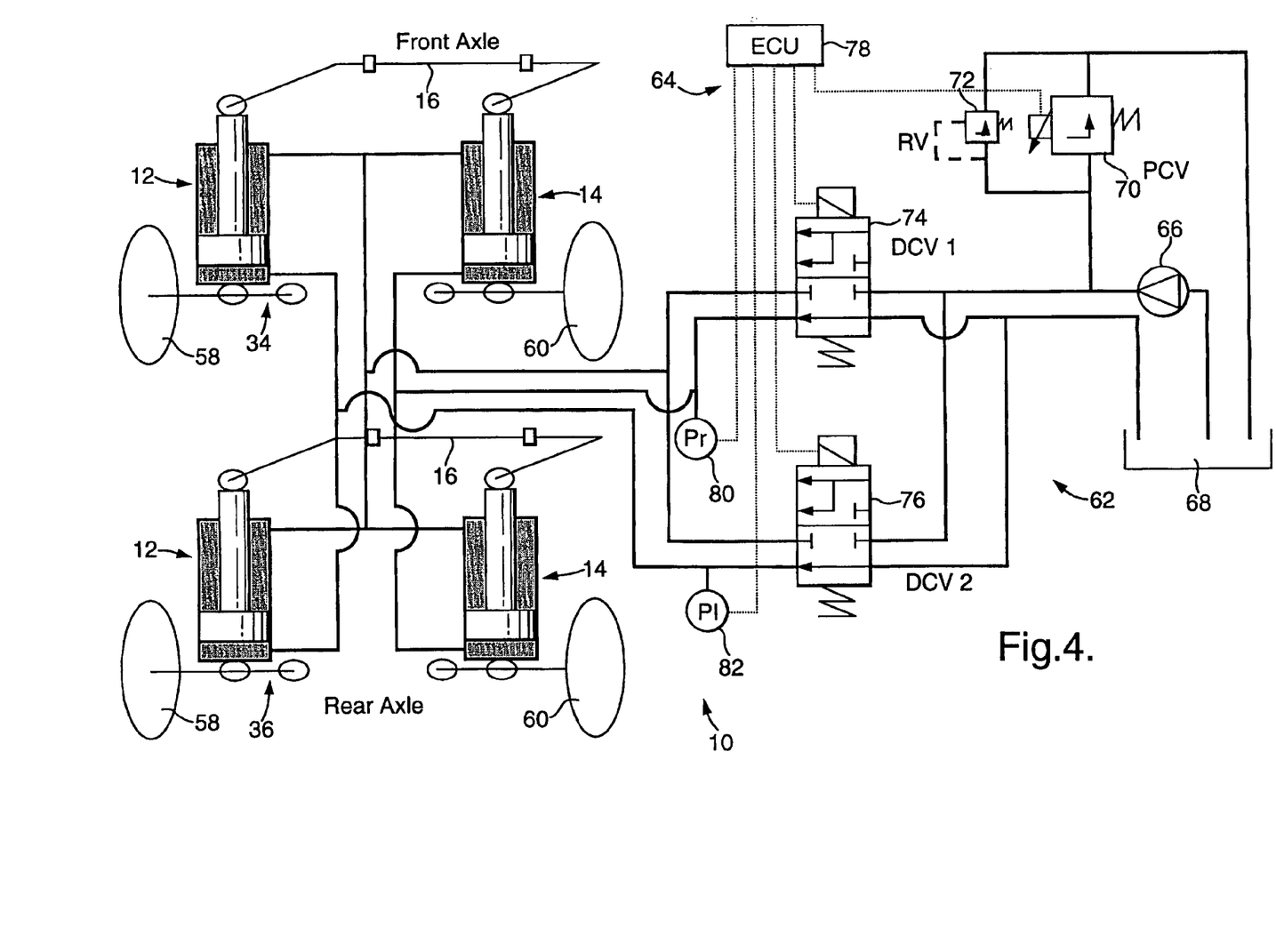
FIG. 4 is a schematic view of a roll control system in accordance with the present invention showing a first embodiment of the hydraulic system.

FIG. 4 shows the roll control system 10 with a first embodiment of the hydraulic system 62 and electrical control system 64. The hydraulic system includes a fluid pump 66, a tank or reservoir 68, a pressure control valve 70, a pressure relief valve 72, a first directional valve 74, and a second directional valve 76. The electrical control system 64 includes a control module 78 which is electrically connected to the pressure control valve 70, and the first and second directional valves 74,76, to control the operation thereof. The module 78 is also connected to pressure sensors 80,82 which monitor the applied fluid pressure and the tank fluid pressure. The module 78 is also connected to other vehicle sensors (not shown). From the signals from the various sensors, the control module 78 determines if roll control is required and actuates the pressure control valve 78 and the directional valves 74,76 as appropriate.

In this first embodiment, each directional valve 74,76 is solenoid actuated and has two positions. When both directional valves 74,76 are in their rest position, as shown in FIG. 4, the compression chambers 40,50 are connected to the tank 68, and the rebound chambers 42,52 are isolated—which is the failure mode or locked mode for the roll control system 10. When the first directional valve 74 is actuated, and the second directional valve 76 remains de-actuated, the roll control system 10 is set for the vehicle cornering to the left (as described above for FIG. 2). When the first directional valve 74 is de-actuated, and the second directional valve 76 is actuated, the roll control system 10 is set for the vehicle cornering to the right (as described above for FIG. 3). The pressure of the fluid, as generated by the pump 66, is controlled by the pressure control valve 70.

Figure 5:
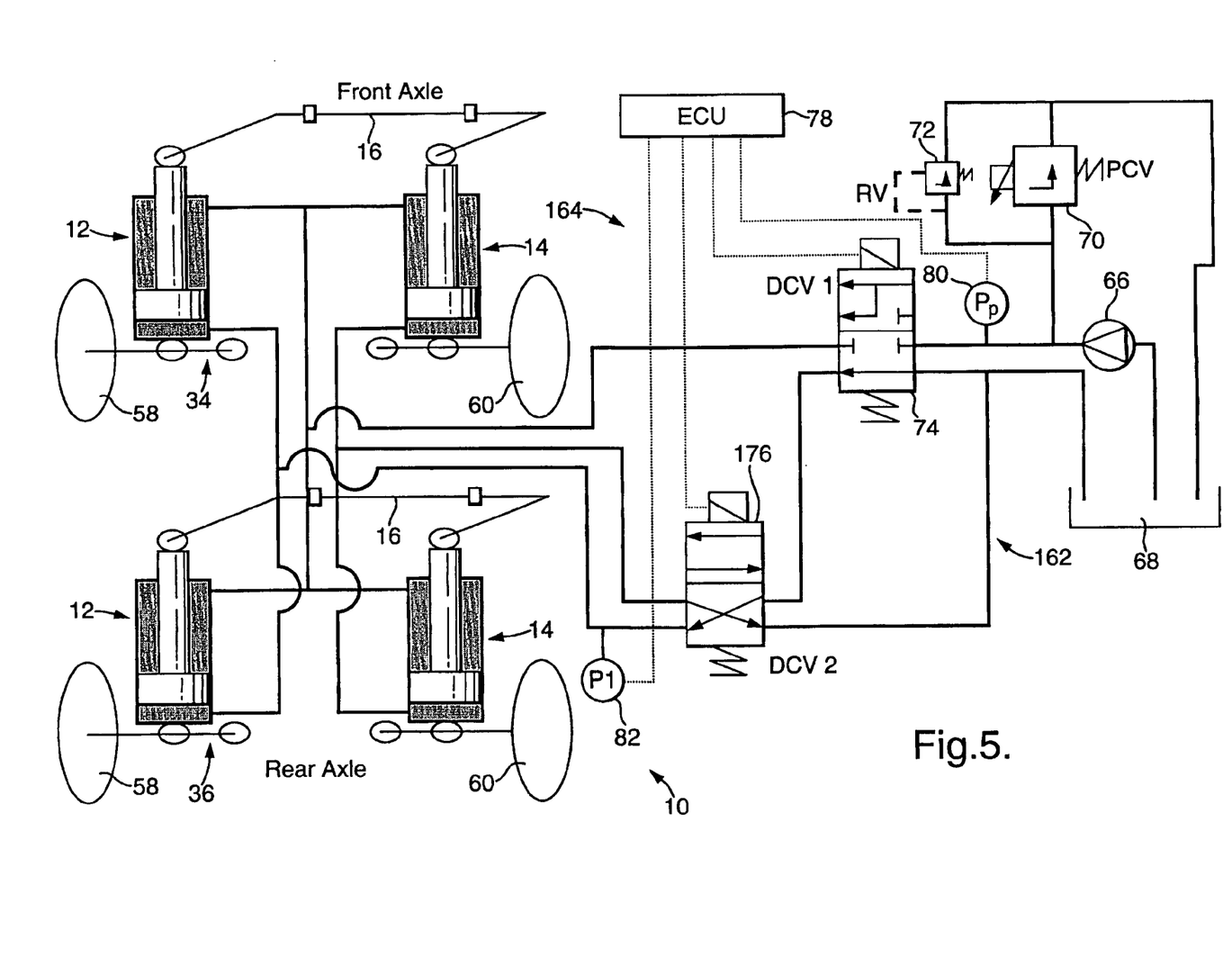
FIG. 5 is a schematic view of a roll control system in accordance with the present invention showing a second embodiment of the hydraulic system.

FIG. 5 shows the roll control system 10 with a second embodiment of the hydraulic system 162 and electrical control system 164. The hydraulic system 162 is substantially identical to the first embodiment and like parts have been given the same reference numeral. In the second embodiment, the second directional valve 176 has changed and the fluid connections for the directional valves 74,176 have also been changed. The electrical control system 164 is substantially identical to the first embodiment and like parts have been given the same reference numeral.

In this second embodiment, each directional valve 74,176 is solenoid actuated and has two positions. When both directional valves 74,176 are in their rest position, as shown in FIG. 5, the compression chambers 40,50 are connected to the tank 68, and the rebound chambers 42,52 are isolated—which is the failure mode or locked mode for the roll control system 10. When the first directional valve 74 is actuated, and the second directional valve 176 remains de-actuated, the roll control system 10 is set for the vehicle cornering to the right (as described above for FIG. 3). When the first directional valve 74 is actuated, and the second directional valve 176 is actuated, the roll control system 10 is set for the vehicle cornering to the left (as described above for FIG. 2). Other aspects of the second embodiment, and the operation of the roll control system are substantially identical to that above with respect to the first embodiment. The pressure relief valve 72 may be omitted and, as an alternative, a fluid flow restriction may be included in the first directional valve 74.

Figure 6:
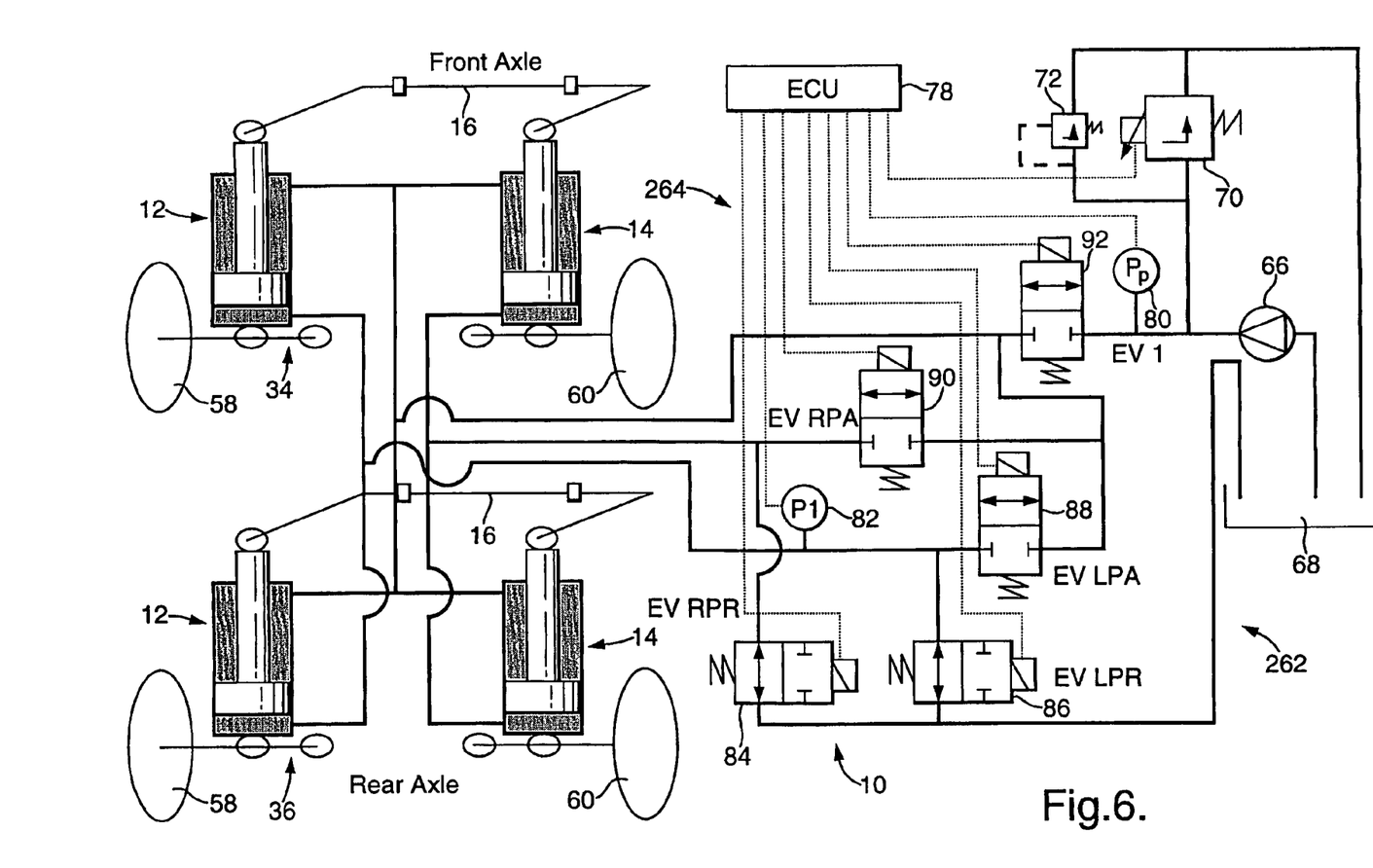
FIG. 6 is a schematic view of a roll control system in accordance with the present invention showing a third embodiment of the hydraulic system.

FIG. 6 shows the roll control system 10 with a third embodiment of the hydraulic system 262 and electrical control system 264. In the third embodiment of the hydraulic system 262 the first and second directional valves are replaced by first, second, third, fourth and fifth electro-valves 84,86,88,90,92. The electrical control system 264 is substantially identical to the first embodiment and like parts have been given the same reference numeral. In this third embodiment, each electro-valve 84–92 is actuated by the control module 78 as required.

In this third embodiment, each electro-valve 84–92 is solenoid actuated and has two positions—either allowing fluid flow or blocking fluid flow. When the electro-valves 84—92 are in their rest position, as shown in FIG. 6, the compression chambers 40,50 are connected to the tank 68, and the rebound chambers 42,52 are isolated—which is the failure mode or locked mode for the roll control system 10. When the first, fourth and fifth electro-valves 84,90,92 are actuated, and the second and third electro-valves 86,88 remain de-actuated, the roll control system 10 is set for the vehicle cornering to the left (as described above for FIG. 2). When the second, third and fifth electro-valves 86,88,92 are actuated, and the first and fourth electro-valves 84,90 are de-actuated, the roll control system 10 is set for the vehicle cornering to the right (as described above for FIG. 3). Other aspects of the third embodiment, and the operation of the roll control system are substantially identical to that above with respect to the first embodiment. Each electro-valve 84–92 may be replaced by a pilot valve.

Figure 7:
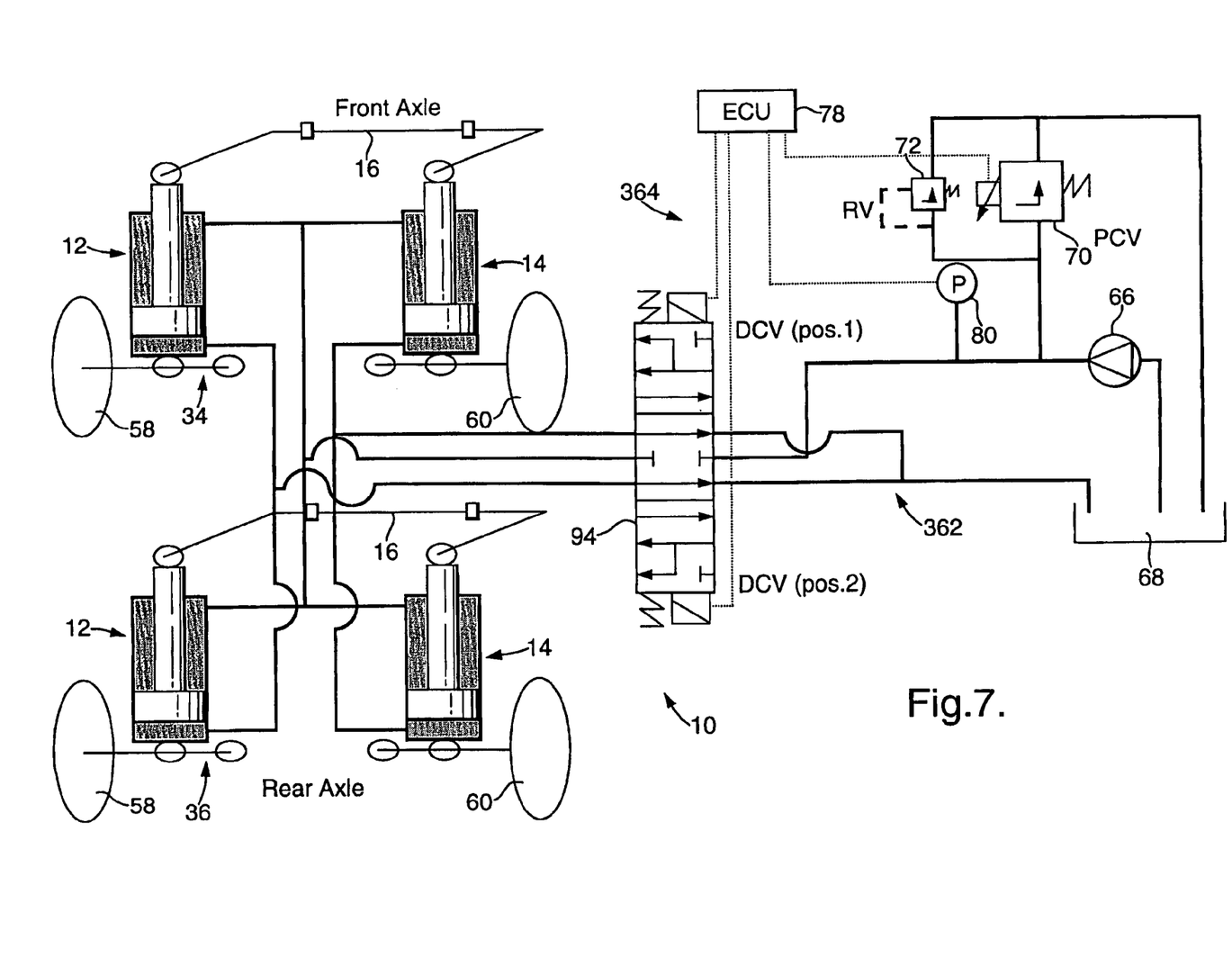
FIG. 7 is a schematic view of a roll control system in accordance with the present invention showing a fourth embodiment of the hydraulic system.

FIG. 7 shows the roll control system 10 with a fourth embodiment of the hydraulic system 362 and electrical control system 364. The hydraulic system 362 is substantially identical to the first embodiment and like parts have been given the same reference numeral. In the fourth embodiment, a single directional valves 94 replaces the first and second directional valves, and the fluid connections for the directional valve has also been changed. The electrical control system 364 is substantially identical to the first embodiment (except that one pressure sensor is omitted) and like parts have been given the same reference numeral.

In this fourth embodiment, the directional valve 94 is solenoid actuated and has three positions. When the directional valve 94 is in its rest position, as shown in FIG. 7, the compression chambers 40,50 are connected to the tank 68, and the rebound chambers 42,52 are isolated—which is the failure mode or locked mode for the roll control system 10. When the directional valve 94 is actuated to its first actuated position, the roll control system 10 is set for the vehicle cornering to the left (as described above for FIG. 2). When the directional valve 94 is actuated to its second actuated position, the roll control system 10 is set for the vehicle cornering to the right (as described above for FIG. 3). Other aspects of the fourth embodiment, and the operation of the roll control system are substantially identical to that above with respect to the first embodiment. The pressure relief valve 72 may be omitted and, as an alternative, a fluid flow restriction may be included in the directional valve 94.

The roll control system 10 of the present invention has a normally compressed arrangement—that is, the actuators 12,14 will move to a compressed state when the roll control system 10 is not actuated which provides benefits in terms of packaging. A minimum applied fluid pressure may be used to provide the tendency to be compressed, and/or a spring may be associated with each actuator to provide the tendency to be compressed. The use of two actuators 12,14 for each axle increases free wheel articulation. The present invention will allow the same pressure and flow requirements for both left and right cornering, and provides smooth transition between left and right turns. In the failure mode, the rebound chambers 42,52, and hence the torsion bars 16, are locked.

A bypass valve may be provided in or with the actuators 12,14 to ensure that the pressure in the compression chambers 40,50 is the same as, or less than, the pressure in the rebound chambers 42,52. Such an arrangement reduces the risk of cavitation and noise issues, and improves ride comfort.

The above embodiments describe a roll control system for front and rear axles of a motor vehicle. The present invention is also applicable to a single axle of a motor vehicle and would comprise a single torsion bar with a hydraulic actuator at either end thereof. Further, the orientation of each hydraulic actuator may be reversed with the housing connected to one end of the torsion bar, and the piston rod attachable to the axle.

The invention claimed is:

1. A roll control system for a motor vehicle comprising a torsion bar (16); a first hydraulic actuator (12) connected to one end (20) of the torsion bar and connectable to an axle (34) of the vehicle; a second hydraulic actuator (14) connected to the other end (28) of the torsion bar and connectable to the axle of the vehicle; a hydraulic control system (62) connected to the hydraulic actuators and including a source of fluid pressure (66), a fluid reservoir (68), at least one supply valve (74,76), and a pressure control valve (70); and an electrical control system (64) controlling the hydraulic system dependent on sensed vehicle conditions; wherein each hydraulic actuator comprises a rebound chamber (42, 52) and a compression chamber (40,50) separated by a piston (38,48), and a piston rod (18,26) attached to the piston and extending through and out of the rebound chamber; wherein, during straight line motion of the vehicle, the electrical control system actuates the supply valve or valves to isolate the rebound chambers and to connect the compression chambers to the fluid reservoir; and wherein, during turning motion of the vehicle in one direction, the electrical control system actuates the supply valve or valves to connect the rebound chambers to a controlled fluid pressure from the hydraulic control system, to connect the compression chamber remote from the turning direction to the controlled fluid pressure, and to connect the other compression chamber to the fluid reservoir.

2. A roll control system as claimed in claim 1; wherein the at least one supply valve of the hydraulic control system (62,162) comprises a first directional valve (74,174) and a second directional valve (76,176); each directional valve having a rest position and an actuated position; wherein both valves are in the rest position during straight line motion of the vehicle; and wherein one valve is in the rest position and the other valve is actuated during turning motion of the vehicle.

3. A roll control system as claimed in claim 2, wherein the electrical control system (62) comprises a control module (78) connected to, and controlling the operation of, the at least one supply valve (74,76) and the pressure control valve (70); and a pressure sensor (80) monitoring the fluid pressure in the hydraulic control system (62) and providing a signal to the control module.

4. A roll control system as claimed in claim 2, further comprising a second torsion bar (16); a third hydraulic actuator (12) connected to one end (20) of the second torsion bar and connectable to a second axle (36) of the vehicle; a fourth hydraulic actuator (14) connected to the other end (28) of the second torsion bar and connectable to the second axle of the vehicle; wherein the first and third hydraulic actuators are on one side of the vehicle, and the second and fourth hydraulic actuators are on the other side of the vehicle; wherein the compression chambers (40) of the first and third hydraulic actuators are fluidly connected; wherein the compression chambers (50) of the second and fourth hydraulic actuators are fluidly connected; and wherein the compression chambers (42,52) of the hydraulic actuators are fluidly connected.

5. A roll control system as claimed in claim 2, wherein each hydraulic actuator (12,14) has a bypass valve to ensure that the fluid pressure in the compression chamber (40,50) is the same as, or lower than, the fluid pressure in the rebound chamber (42,52).

6. A roll control system as claimed in claim 2, wherein parameters of the system are predetermined such that the force compressing one of the first or second hydraulic actuator is greater than the force extending the other of the first or second hydraulic actuator during turning motion of the vehicle.

7. A roll control system as claimed in claim 1, wherein the at least one supply valve of the hydraulic control system (262) comprises first, second, third, fourth and fifth electro-valves (84–92); each electro-valve having a rest position and an actuated position; wherein all the valves are in their rest position during straight line motion of the vehicle; and wherein three of the valves are in their actuated position and the other two valves in their rest position during turning motion of the vehicle.

8. A roll control system as claimed in claim 7, wherein the electrical control system (62) comprises a control module (78) connected to, and controlling the operation of, the at least one supply valve (74,76) and the pressure control valve (70); and a pressure sensor (80) monitoring the fluid pressure in the hydraulic control system (62) and providing a signal to the control module.

9. A roll control system as claimed in claim 7, further comprising a second torsion bar (16); a third hydraulic actuator (12) connected to one end (20) of the second torsion bar and connectable to a second axle (36) of the vehicle; a fourth hydraulic actuator (14) connected to the other end (28) of the second torsion bar and connectable to the second axle of the vehicle; wherein the first and third hydraulic actuators are on one side of the vehicle, and the second and fourth hydraulic actuators are on the other side of the vehicle; wherein the compression chambers (40) of the first and third hydraulic actuators are fluidly connected; wherein the compression chambers (50) of the second and fourth hydraulic actuators are fluidly connected; and wherein the compression chambers (42,52) of the hydraulic actuators are fluidly connected.

10. A roll control system as claimed in claim 7, wherein each hydraulic actuator (12,14) has a bypass valve to ensure that the fluid pressure in the compression chamber (40,50) is the same as, or lower than, the fluid pressure in the rebound chamber (42,52).

11. A roll control system as claimed in claim 7, wherein parameters of the system are predetermined such that the force compressing one of the first or second hydraulic actuator is greater than the force extending the other of the first or second hydraulic actuator during turning motion of the vehicle.

12. A roll control system as claimed in claim 1, wherein the at least one supply valve of the hydraulic control system (362) comprises a single directional valve (94); the valve having a rest position, a first actuated position, and a second actuated position; wherein the valve is in the rest position during straight line motion of the vehicle; and wherein the valve is in the first or the second actuated position, dependent on the direction of turning, during turning motion of the vehicle.

13. A roll control system as claimed in claim 12, wherein the electrical control system (62) comprises a control module (78) connected to, and controlling the operation of, the at least one supply valve (74,76) and the pressure control valve (70); and a pressure sensor (80) monitoring the fluid pressure in the hydraulic control system (62) and providing a signal to the control module.

14. A roll control system as claimed in claim 12, further comprising a second torsion bar (16); a third hydraulic actuator (12) connected to one end (20) of the second torsion bar and connectable to a second axle (36) of the vehicle; a fourth hydraulic actuator (14) connected to the other end (28) of the second torsion bar and connectable to the second axle of the vehicle; wherein the first and third hydraulic actuators are on one side of the vehicle, and the second and fourth hydraulic actuators are on the other side of the vehicle; wherein the compression chambers (40) of the first and third hydraulic actuators are fluidly connected; wherein the compression chambers (50) of the second and fourth hydraulic actuators are fluidly connected; and wherein the compression chambers (42,52) of the hydraulic actuators are fluidly connected.

15. A roll control system as claimed in claim 12, wherein each hydraulic actuator (12,14) has a bypass valve to ensure that the fluid pressure in the compression chamber (40,50) is the same as, or lower than, the fluid pressure in the rebound chamber (42,52).

16. A roll control system as claimed in claim 12, wherein parameters of the system are predetermined such that the force compressing one of the first or second hydraulic actuator is greater than the force extending the other of the first or second hydraulic actuator during turning motion of the vehicle.

17. A roll control system as claimed in claim 1, wherein the or each supply valve is solenoid actuated.

18. A roll control system as claimed in claim 1, wherein the electrical control system (62) comprises a control module (78) connected to, and controlling the operation of, the at least one supply valve (74,76) and the pressure control valve (70); and a pressure sensor (80) monitoring the fluid pressure in the hydraulic control system (62) and providing a signal to the control module.

19. A roll control system as claimed in claim 1, further comprising a second torsion bar (16); a third hydraulic actuator (12) connected to one end (20) of the second torsion bar and connectable to a second axle (36) of the vehicle; a fourth hydraulic actuator (14) connected to the other end (28) of the second torsion bar and connectable to the second axle of the vehicle; wherein the first and third hydraulic actuators are on one side of the vehicle, and the second and fourth hydraulic actuators are on the other side of the vehicle; wherein the compression chambers (40) of the first and third hydraulic actuators are fluidly connected; wherein the compression chambers (50) of the second and fourth hydraulic actuators are fluidly connected; and wherein the compression chambers (42,52) of the hydraulic actuators are fluidly connected.

20. A roll control system as claimed in claim 1, wherein each hydraulic actuator (12,14) has a bypass valve to ensure that the fluid pressure in the compression chamber (40,50) is the same as, or lower than, the fluid pressure in the rebound chamber (42,52).

21. A roll control system as claimed in claim 1, wherein parameters of the system are predetermined such that the force compressing one of the first or second hydraulic actuator is greater than the force extending the other of the first or second hydraulic actuator during turning motion of the vehicle.

22. A method of operating a roll control system as claimed in claim 1, comprising detecting motion of the motor vehicle; and, where straight line motion is detected, fluidly isolating the rebound chambers (42,52) of each hydraulic actuator (12,14), and fluidly connecting the compression chambers (40,50) of each hydraulic actuator to the fluid reservoir (68); or, where turning motion is detected in one direction, actuating the supply valve or valves (74,76) to connect the rebound chambers to a controlled fluid pressure from the hydraulic control system (62), to connect the compression chamber or chambers remote from the turning direction to the controlled fluid pressure, and to connect the other compression chamber or chambers to the fluid reservoir.

* * * * *